United States Patent [19]

Jiang et al.

[11] Patent Number: 6,078,941
[45] Date of Patent: Jun. 20, 2000

[54] COMPUTATIONAL STRUCTURE HAVING MULTIPLE STAGES WHEREIN EACH STAGE INCLUDES A PAIR OF ADDERS AND A MULTIPLEXING CIRCUIT CAPABLE OF OPERATING IN PARALLEL

[75] Inventors: Shao-Kun Jiang, San Diego; Roney S. Wong, Sunnyvale; Seungyoon Peter-Song, Los Altos, all of Calif.

[73] Assignee: Samsung Electronics Co., Ltd., Kyungki-do, Rep. of Korea

[21] Appl. No.: 09/209,957

[22] Filed: Dec. 10, 1998

Related U.S. Application Data

[63] Continuation of application No. 08/746,881, Nov. 18, 1996, abandoned.

[51] Int. Cl.$^7$ ........................................... G06F 7/52
[52] U.S. Cl. ......................... 708/625; 708/505; 708/650; 712/200; 712/221
[58] Field of Search .................................. 712/200, 203, 712/204, 210–221, 222

[56] References Cited

U.S. PATENT DOCUMENTS

| | | | |
|---|---|---|---|
| 4,887,232 | 12/1989 | Wolrich et al. | 708/505 |
| 5,072,419 | 12/1991 | Zyner | 708/625 |
| 5,283,755 | 2/1994 | Bechade | 708/625 |
| 5,457,646 | 10/1995 | Jang et al. | 708/625 |
| 5,771,391 | 6/1998 | Lloyd et al. | 712/1 |

*Primary Examiner*—Meng-Ai T. An
*Assistant Examiner*—Mackly Monestime
*Attorney, Agent, or Firm*—Skjerven, Morrill, MacPherson, Franklin & Friel LLP; Alan H. MacPherson; David T. Millers

[57] ABSTRACT

A modular computational structure includes a pipeline having first and second adder stages. Each adder stage includes a pair of adders which operate in parallel, and outputs ports of the first adder stage are coupled to input ports of the second adder stage. Rounding logic and an accumulator are included in the second stage. By varying the inputs to the first and second stages a variety of complex arithmetic functions suitable for video encoding can be implemented. Examples of the operations include completion of multiply and multiply-and-accumulate operations, averages of two values, averages of four values, and merged difference and absolute value calculation.

13 Claims, 5 Drawing Sheets

COMPUTATIONAL STRUCTURE HAVING MULTIPLE STAGES WHEREIN EACH STAGE INCLUDES A PAIR OF ADDERS AND A MULTIPLEXING CIRCUIT CAPABLE OF OPERATING IN PARALLEL

This application is a continuation of application Ser. No. 08/746,881 filed on Nov. 18, 1996, now abandoned.

BACKGROUND OF THE INVENTION

1. Field of the Invention

This invention relates to an arithmetic circuit for performing a variety of multiple data input operations that are useful, for example, in video encoding and decoding.

2. Description of Related Art

Video encoding and decoding typically requires repetitive calculation which manipulate relatively large amounts of data that is often arranged in two dimensional data arrays such as pixel maps. Processing architectures which process one data element (or pixel) at a time can be slow for video encoding and decoding because of the large number of data elements which must be processed. Accordingly, vector processing architectures have been developed which perform multiple simultaneous operations in parallel on multiple data elements. For example, in a single instruction multiple data (SIMD) architecture, a processor performing a single instruction performs the same operation on multiple data elements in parallel.

Additionally, video processing of each data element typically requires more than one basic arithmetic operations. For example, taking an average of four pixel values requires three additions and one division (or rounding), and a process only capable of basic arithmetic operations such as shifts, rotates, addition, subtraction, multiplication, and division may require four instructions to complete an average. A special arithmetic circuit can be implemented for specific operations, but adding such special circuits to a processor increases the processor's size and cost. Additionally, implementing specific hardware for each of a large number of complex tasks used in video encoding and decoding is impractical because it greatly increases the complexity of the processor which can harm performance. A processing architecture is thus sought which quickly performs a large variety of complex task used in video encoding and decoding but does not greatly increase circuit complexity.

SUMMARY OF THE INVENTION

In accordance with the invention, a vector processor includes multiple copies of a modular computational structure (MCS) which efficiently performs a large variety of arithmetic operations. In particular, the MCSs allows the vector processor to implement instructions which perform complex arithmetic operations that are common to video processing such as MPEG encoding and decoding. In one embodiment of the invention, each MCS includes two adder stages. The first adder stage includes a pair of adders which operate in parallel or joined for addition of extended values. The second stage includes a second pair of adders which also operate in parallel. The second stage further includes rounding logic which can be used for rounding operations and or division by powers of two and accumulators and shifters for accumulate operations. To improve flexibility each stage is preceded by interconnected multiplexers which allow data to bypass the first or second stage so that the latency of an operation in the computational structure may be one or two clock cycles. The multiplexer are also coupled to a variety of input signals which are selected in different combinations to execute different arithmetic operations.

The MCS implements basic arithmetic operations such as addition, subtraction, and rounding. Additionally, output signals from a multiplier which represents a product as a sum and a carry can be input to the first stage of the MCS for completion a multiply operation. After completion of the multiply operation the result can be output from the MCS or passed to the second stage for an addition or subtraction that completes a multiply-and-accumulate operation.

In addition to basic arithmetic operations, the MCS also performs more complex arithmetic operations tailored to video processing. For example, one application of the pipeline structure calculates an average of up to four data elements. In the first stage of this operation, four data elements are input to a pair of adders which calculate two sums. The second stage adds the two sums together and in parallel determines appropriate rounding to divide the result by four. Operands for the instruction (VAVGQ) which performs average of four data elements are two vector registers, where each vector register contains multiple data elements, for example, up to 32 data elements per vector register. If the first vector register contains pixels values from a row of a pixel map and the second vector register contains pixel values from an adjacent row, one instruction completes an average of four pixel values that are adjacent in a two-dimensional array.

Such averages of pixel values is a common when reducing the size of a pixel map.

A variety of other instructions or arithmetic operations executed by the pipeline are described below.

BRIEF DESCRIPTION OF THE DRAWINGS

Use of the same reference symbols in different figures indicates similar or identical items.

DETAILED DESCRIPTION OF THE PREFERRED EMBODIMENTS

As an aspect of the invention, a modular computational structure (MCS) includes a first adder stage and a second adder stage, where the second adder stage includes rounding logic and an accumulation register. In an exemplary embodiment each adder stage includes two adders which can operate in parallel or joined for addition of larger values. The accumulation register is coupled to a shifter for shift operations on an accumulated value. Multiplexers for data input into each stage have input ports coupled to the other stage and to arithmetic circuits such as sign extension logic. Additionally, a variety of different input signals are provided to the input multiplexer. The combination of the adder stages, the interconnections, and the variety of different input signals permits the pipelined computational structure to perform a variety of basic and complex arithmetic at a high clock rate with a through put of about one operation per clock cycle and a latency less than or equal to three clock cycles.

Figure 1:
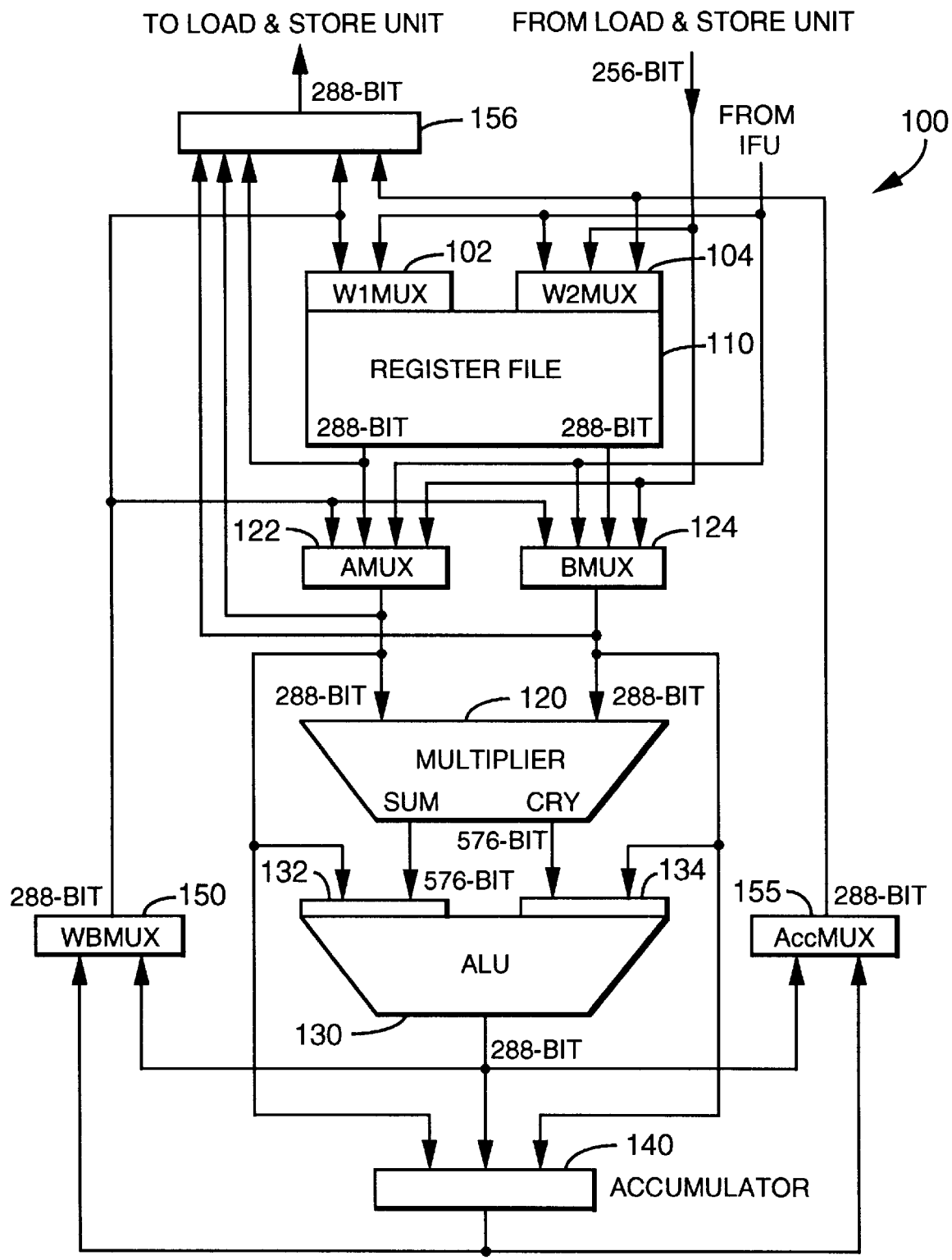
FIG. 1 is a block diagram for an execution data path for the vector processor in accordance with an embodiment of the invention.

In an exemplary embodiment of the invention, the pipelined computational structure is implemented in a vector processor. FIG. 1 shows an execution data path 100 for a vector processor in accordance with an embodiment of the invention. Co-owned U.S. patent application Ser. No. 08/699,597, entitled "Single-Instruction-Multiple-Data Processing in a Multimedia Signal Processor", filed Aug. 19, 1996, which is hereby incorporated by reference in its entirety, describes an exemplary embodiment of the vector processor containing data path 100 and an instruction set for the vector processor. Data path 100 controls data flow during execution of issued instructions. The present invention is primarily concerned with circuits and methods for performing arithmetic operations. Accordingly, the following description is aimed at execution of instructions which include an arithmetic operation. Executing such instructions proceeds in three stages. A read stage fetches the necessary operands for the instruction, typically by reading values from a register file 110. An execution stage executes an arithmetic or other operation indicated by the instruction. A write stage writes results back to register file 110.

Figure 2:
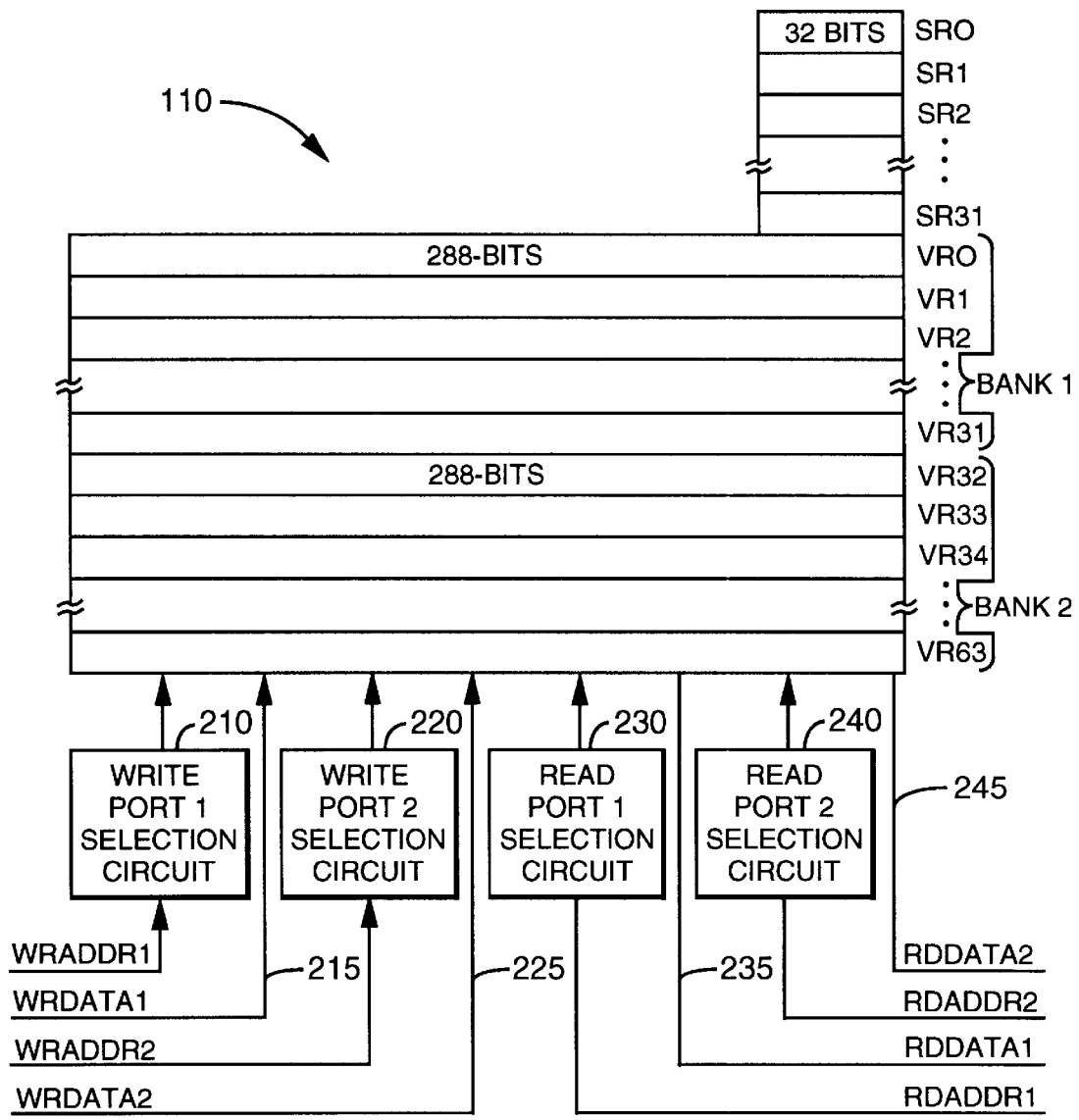
FIG. 2 is a block diagram of a register file for the execution data path of FIG. 1.

FIG. 2 is a block diagram of an exemplary embodiment of register file 110 which is typically accessed during the read stage. In the exemplary embodiment, register file 110 includes 32 32-bit scalar registers SR0 to SR31 and 64 288-bit vector registers VR0 to VR31 in bank 0 and VR0 to VR31 in bank 1. Each scalar register stores a single data element, and each vector register stores between 8 and 32 data elements. For the exemplary embodiment, data elements are 8-bit, 9-bit, 16-bit or 32-bit quantities, and the 32-bit data elements can either have an integer data type or a floating point data type such as the IEEE-754 floating point data type.

Register file 110 has two read ports and two write ports to accommodate up to two reads and two writes each clock cycle. Each port includes a select circuit 210, 220, 230, or 240 and a 288-bit data bus 215, 225, 235 or 245. Each of selection circuits 210, 220, 230, and 240 uses a respective address signal WRADDR1, WRADDR2, RDADDR1, or RDADDR2 in a well known manner to select one scalar or vector register. An address is derived from a 5-bit register number which is typically extracted from an instruction, a bank bit from the instruction or a control register of the vector processor, and the instruction's syntax which indicates whether the selected register is a vector or scalar register. Most instructions require two operands which can be read from two registers in one clock cycle. However, some instructions such as a multiply-and-add instruction VMAD and instructions that manipulate double-size vectors require data from more than two register operands so that the read stage is longer than one clock cycle.

As shown in FIG. 1, data read from register file 110 is routed through a multiplexer 156 to a load/store unit or through operand selection multiplexers 122 and 124 for possible selection as operands for arithmetic operations. Additionally, an immediate value from an instruction in an instruction fetch unit may be provided to multiplexers 122 and 124 as a potential operand.

For the execution stage, data path 100 includes a multiplier 120, an arithmetic logic unit (ALU) 130, and a vector accumulator 140. Multiplexers 122 and 124 provide operands to multiplier 120, arithmetic logic unit 120, and accumulator 140. The execution stage can overlap the read stage if reading the operands requires multiple cycles, and the duration of the execution stage depends primarily on the instruction type and the data element type (integer or floating point). During the execution stage, multiplier 120, arithmetic logic unit 130, and accumulator 140 process operands previously read from register file 110.

Upon completion of the execution stage, an instruction enters the write stage where results from the execution stage and/or a value from the load/store unit may be stored in register file 110. A multiplexer 150 and/or a multiplexer 155 provide results to register file 110. Multiplexers 102 and 104 can select two data values to be written during a single clock cycle. In accordance with an aspect of the invention, arithmetic operations for two instructions can complete in the same clock cycle because the later issued instruction required fewer clock cycles to complete. In such cases, both results can be written to register file 110 unless the load store unit also returns a value to be written to register file 110 in the same clock cycle. The duration of write stage depends on the amount of data to be written as a result of the operation and competition from LSU 250 which may be completing a load instruction.

Figure 3:
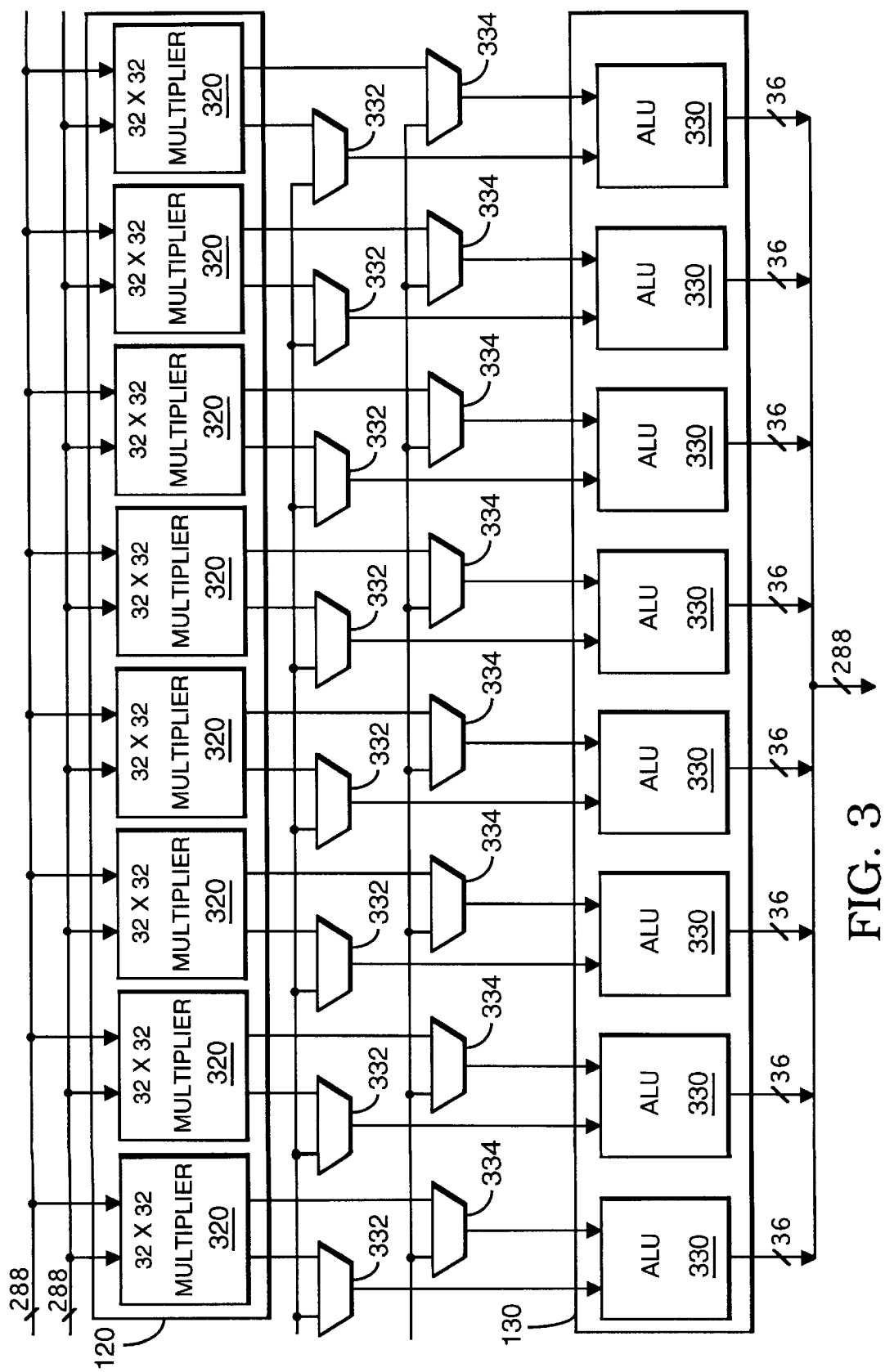
FIG. 3 is a block diagram illustrating division of the execution data path of FIG. 1 into multiple separate computational modules.

FIG. 3 shows a block diagram of an embodiment of multiplier 120 and ALU 130. Multiplier 120 contains eight independent multipliers 320 each of which can be configured as a 32×32-bit multiplier, two 16×16-bit multipliers, or four 8×8-bit multipliers depending on whether the instruction being executed uses 32-bit, 16-bit, or 8-bit data elements. Multiplication of 9-bit data elements is not supported in the exemplary embodiment. U.S. patent application Ser. No. 08/734,277 entitled "Parallel Multiplier that Supports Multiple Numbers with Different Bit Lengths", filed Oct. 21, 1996, describes suitable multipliers and is incorporated by reference herein in its entirety. For the 32-bit data element size (integer or floating point type), 16-bit data size, or 8-bit data size, each multiplier 320 performs 1, 2, or 4 multiplications, and multiplier 120 performs 8, 16, or 32 parallel multiplications each clock cycle.

Figure 4:
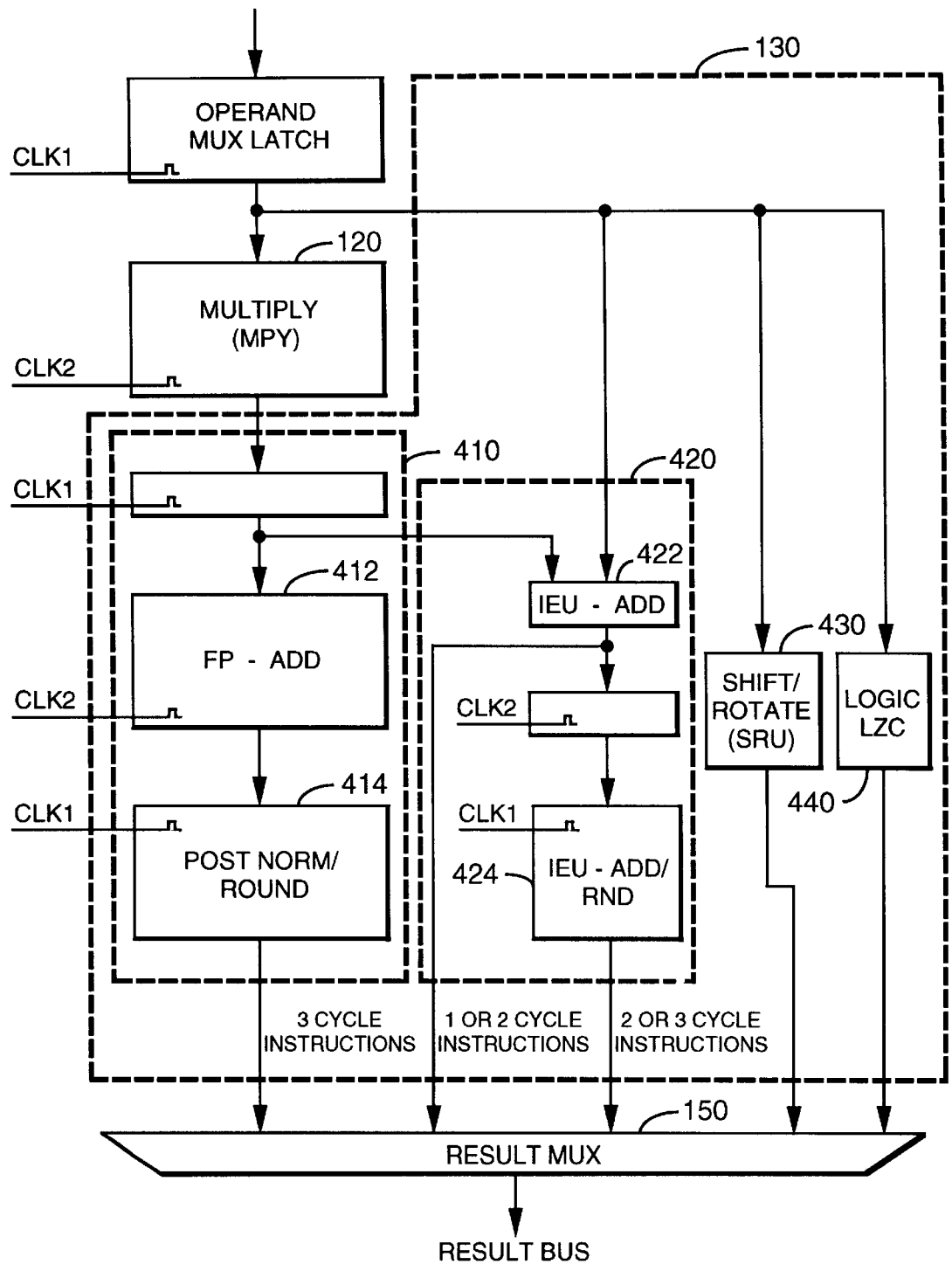
FIG. 4 is a block diagram of a portion of the data of FIG. 1 and illustrates floating point and integer computational units.

ALU 130 can process the results from multiplier 120 or process operands from operand selection multiplexers 122 and 124. ALU 130 contains eight independent ALUs 330. FIG. 4 is a block diagram of a portion of data path 100 and illustrates an embodiment of ALU 130 arranged by function.

ALU 130 contains a floating point unit 410. In the exemplary embodiment, floating point unit 410 implements eight 32-bit MAC units, and each 32-bit MAC unit includes a sign pipeline, a exponent pipeline, and a mantissa pipeline which is associated one of multipliers 330. Co-filed U.S. patent application Ser. No. 08/751,563, entitled "Fused Floating-Point Multiply-and-Accumulate Unit with Carry Correction" describes a suitable fused MAC unit for performing floating point addition, subtraction, multiplication, division, and multiply-and-accumulate (MAC) operations. Such floating point MAC operations required three clock cycles, one clock cycle for multiplication by multipliers 330, another clock cycle for an addition stage 412, and a final clock cycle for normalization and rounding stage 414.

For integer processing, ALU 130 includes a shift/rotate unit 430, a logic unit 440, and a adder unit 420. Adder unit 420 is an arithmetic operation pipeline that includes a first adder stage 422 and a second adder stage 424. Second adder stage 424 also includes circuitry for result rounding and use of vector accumulator 140. Adder unit 420 is partitioned into eight separate modular computational structures (MCSs), each of which is associated with one of the multipliers 320 shown in FIG. 3.

Figure 5:
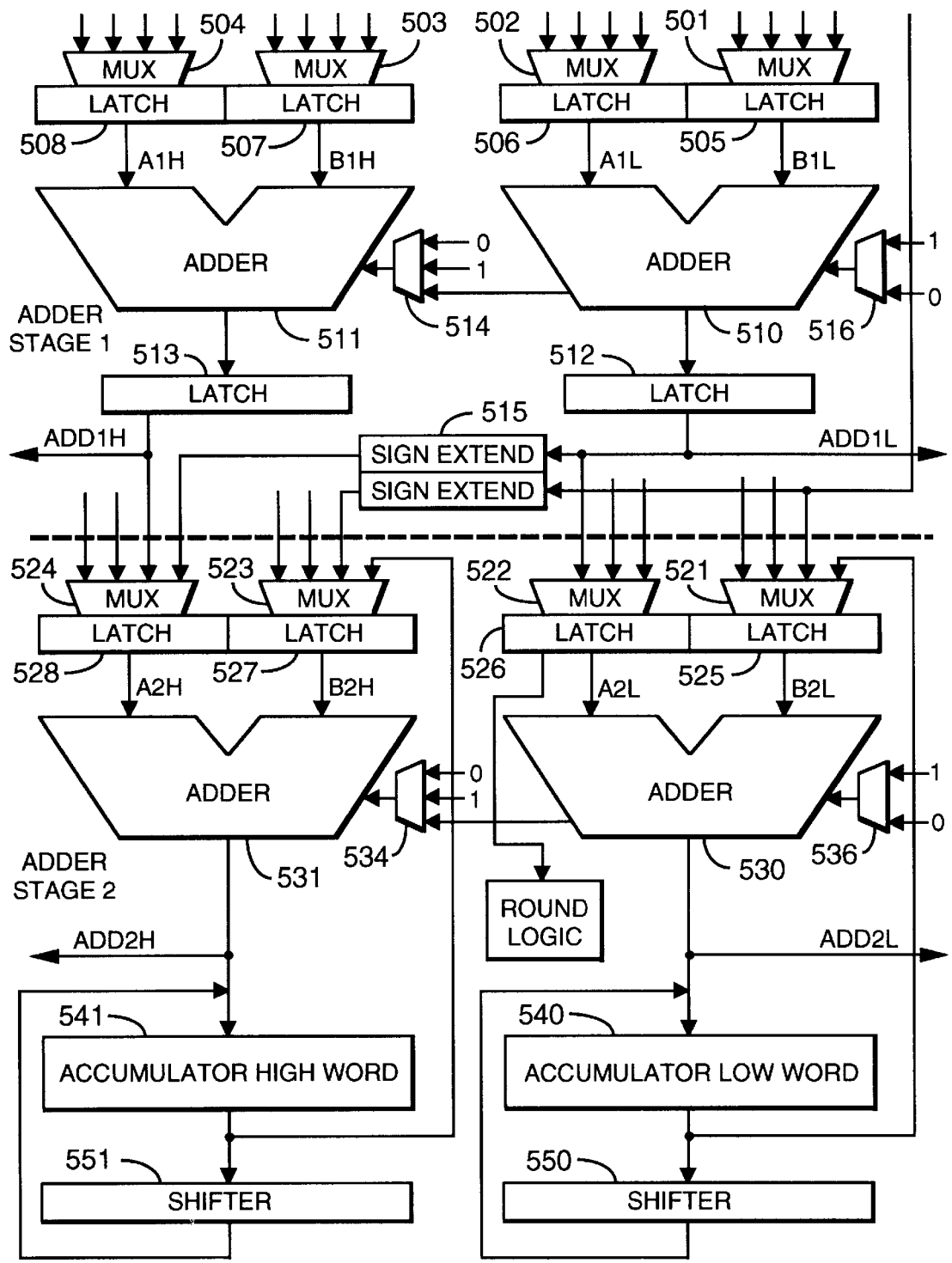
FIG. 5 is a block diagram of a modular computational structure in accordance with an embodiment of the invention.

FIG. 5 is a block diagram of an MCS 500 in accordance with an embodiment of the invention. The first stage of MCS 500 includes a pair of adders 510 and 511 each having a 36-bit data width. Input multiplexers 501 to 504 select input values B1L, A1L, B1H, and A1H which are held in respective latches 505 to 508 for addition during a current clock cycle. The number of input terminals shown in FIG. 5 for multiplexers 501 to 504 is symbolic for ease of illustration. Table A.4 in the Appendix describes the input signals selected for signals A1L, B1L, A1H, and B1H in an exemplary embodiment of the invention. Possible 36-bit input signal include signals Ra and Rb from registers Ra and Rb, 2*Ra, 2*Rb, $\overline{Ra}$, $\overline{Rb}$ "0", "1", the low words MPYSL and MPYCL and high words MPYSH and MPYCH of multiply sum and carry signals from multiplier 120. A multiplier 516 selects 0 or 1 for a carry bit to adder 510 so that adder 510 can generate a sum or an incremented sum.

Each 36-bit input signal A1L, B1L, A1H, and B1H can represent one 32-bit integer, two 16-bit integers, four 9-bit integers, or four 8-bit integers read from register file 110 or a 36-bit portion of a sum or carry signal from multiplier 120. To handle the different data widths, adders 510 and 511 can be special adders with internal logic for selection of the data width for the multiple parallel operations. Alternatively, conventional adder designs such as well known in the art can be used with specific input bits having encoded values which block the propagation of a carry bit from a one portion of the adder to another so that the portions perform separate parallel additions. Co-filed U.S. patent application Ser. No. 5,943,251, entitled "Adder which Handles Multiple Data with Different Data Types" describes suitable adders and addition methods and is incorporated by reference herein in its entirety.

Many instructions have two 36-bit input signals for each MCS 500 and only use adder 510 in the first adder stage. Double width operations such as multiply, multiply-and-accumulate, and special operations which, for example, determine averages use both adders 510 and 511. A multiplexer 514 selects whether a carry is propagated from adder 510 to adder 511. The carry is propagated when adders 510 and 511 combine to add input signals having a width greater than 36 bits. Multiplexer 514 can also force or block a carry into adder 511. To provide faster addition, adder 511 simultaneously determines the sum S of signals A1H and B1H and the incremented sum S+1 in parallel. The output signal from multiplexer 514 selects either sum S or incremented sum S+1. Results ADD1L and ADD1H from adders 510 and 511 are stored in respective latches 512 and 513.

Some operations such as addition, subtraction, and. multiplication are completed after processing by adder stage 1, but other operations require further processing by adder stage 2. Accordingly, latches 512 and 513 are coupled to adder stage 2 and to results multiplexer 150 (FIG. 1). Adder stage 1 also includes sign extension logic 515 which sign extends result signal ADD1L for addition in adder stage 2. Sign extension logic 515 is also coupled to receive a value C from register file 110 or an immediate value from an instruction for a multiply-and-accumulate operation A*B±C where adder stage 1 adds sum and carry signals from multiplier 120 to determine the product A*B, and adder stage 2 performs the accumulate.

In adder stage 2, input multiplexers 521 to 524 provide input signals B2L, A2L, B2H, and A2H through latches 525 to 528 to adders 530 and 531. Again the number of input ports shown in FIG. 5 for multiplexers is symbolic, and multiplexers 521 to 524 can receive the same input signals as multiplexers 501 to 504. Additionally, multiplexers 521 to 524 receive signals ADDL1 and ADD1H from the first adder stage and signals VACH and VACL representing high and low words from an associated accumulator entry.

Adders 530 and 531 are the same as described above in regard to adders 510 and 511, and must be able to add 36-bit signals representing up to four separate data elements. A multiplexer 534 selects whether to propagate a carry bit from adder 530 to adder 531 for addition of input values wider than 36-bit, block the carry into adder 531 for parallel additions, or force the carry to select an incremented sum S+1 from adder 531. Result signals ADD2L and ADD2H are provided to result multiplexer 150 and to accumulator low word 540 and high word 541.

Stage 2 also includes rounding logic 535 which operates in parallel with adders 530 and 531 to determine how to round sum ADD2L for a divide by two or divide by four operation. Rounding logic 535 is used, for example, for instructions VAVG and VAVGH which average pairs of data elements. Instructions VAVG and VAVGH differ in the selection of input operands. For instruction VAVG, each of vector registers VRa and VRb provides a 36-bit value to each of the eight ALUs 330 shown in FIG. 3. Signal A1L is a 36-bit value from register VRa, and signal B1L is a 36-bit value from register VRb for instruction VAVG. For instruction VAVGH, vector register VRa provides two 36-bit values to each of four eight ALUs 330, and vector register VRb provides two 36-bit values to each of the other four of the eight ALUs 330. Signals A1L and B1L represent adjacent data elements from a single vector register VRa or VRb for instruction VAVGH.

During a first clock cycle of the VAVG or VAVGH instruction, adder 510 adds signals A1L and B1L and passes sum ADD1L to the second adder stage. If the selected rounding type for the operation is truncation, result multiplexer 150 selects a right shifted version of sum ADD1L as the result. If another rounding mode is selected, signal ADD1L is passed to adder stage 2. In adder stage 2, rounding logic 535 determines from the least significant bit of sum ADD1L whether sum ADD1L should be rounded up or rounded down. In parallel, adder 530 increments sum ADD1L, and rounding logic cause result multiplexer 150 to select either the incremented or unincremented value as the result for writing back to a vector register VRd.

The exemplary embodiment of the vector processor includes a double width vector accumulator, and each MCS 500 is associated a pair of words 540 and 541 in the vector accumulator. Signals ADD2H and ADD2L can be stored in associated accumulator words 541 and 540. To add to the value in the accumulator, input multiplexers 521 and 523 select output signals from accumulator words 540 and 541 as signals B2L and B2H which are added to selected signals A2L and A2H. Shifters 550 and 551 perform left or right shifts on the values in the accumulators 540 and 541.

MCS 500 is efficient for performing a number of complex arithmetic operations. For example, an instruction VAVGQ averages four values from two vector registers. To perform the arithmetic operation associated with instruction VAVGQ, a first vector register VRa provides two 36-bit signals indicating consecutive data elements as input signals A1L and B1L to adder 510, and a second vector register VRb provides two 36-bit signals indicating consecutive data elements as input signals A1H and B1H to adder 511. Carry bits for adders 510 and 511 are selected according to a rounding mode, 0 for truncate and 1 for round up. Adders 510 and 511 operate in parallel to generate signals ADD1L and ADD1H which represent sums of two values. Signals ADD1L and ADD1H are right shifted by one bit before adder stage 2 adds them together. Adder, 530 adds signals ADD1L and ADD1H, and adder 531 determines the value of ADD1L+ADD1H+1. Simultaneous with operation of adders 530 and 531 rounding logic 535 determines from the least significant bit and the rounding mode which signal ADD2L or ADD2H is the desired result.

For an instruction VAAS3, the elements in a register Ra are added to elements from a register Rb to produce an intermediate results. Each element in the intermediate results is then incremented, not changed, or decremented if the element from register Ra is respectively positive, zero, or negative. Another instruction VASS3, is the same as instruction VAAS3 except that the intermediate result is decremented, not changed, or incremented if the element of Ra is respectively positive, zero, or negative. To perform the arithmetic operation required for instruction VAAS3 or VASS3, adder 510 in adder stage 1 adds the elements from register Ra to the elements from register Rb and signal ADD1L is selected as signal A2L. A value 1, 0, or −1 is selected for signal B2L depending on whether signal A1L was positive, zero, or negative. Adder 530 generates signal ADD2L which is selected by result multiplexer 150. Accordingly, the general case requires two clock cycles and passing of sign information from stage 1 to stage 2.

Instructions VAAS3 and VASS3 can be completed in a single clock cycle if the instruction is restricted to a first case where registers Rb and Ra are the same registers or a second where the elements of register Rb are negative. In the first case, adder 510 determines the value 2*Ra−1 and adder 511 determines the value 2*Ra+1. In the second case, adder 510 determines the value Ra−1 and adder 511 determines the value Ra+1. In both cases, logic unit 440 determines a leading zero count for value Ra which indicates whether Ra is positive, zero, or negative, and result multiplexer 150 then selects ADD1H, 0, or ADD1L as the result signal.

MCS 500 can also be used for instructions such as VASUB determine the absolute value of the results of a subtraction. For instruction VASUB, adder 510 subtracts a value from register Rb from a value from register Ra, and adder 511 subtracts the value from register Ra from the value from register Rb. Signal ADD1L or ADD1H is selected depending on which one is positive.

MCS 500 supports other instructions describe by the tables in the appendix.

Although the invention has been described with reference to particular embodiments, the description is only an example of the invention's application and should not be taken as a limitation. Various adaptations and combinations of features of the embodiments disclosed are within the scope of the invention as defined by the following claims.

APPENDIX

This following describes a subset of an instruction set for an exemplary embodiment of a vector processor in accordance with an embodiment of the invention. Further description of the instruction set for the exemplary embodiment of the vector processor can be found in co-owned U.S. patent application Ser. No. 08/699,597, entitled "Single-Instruction-Multiple-Data Processing in a Multimedia Signal Processor", which is incorporated by reference above. The listed subset of instructions are referred to as the arithmetic class, the MPEG class, and inter-element arithmetic class and include instructions which in the exemplary embodiment of invention use the computational structure shown in FIG. 5.

The arithmetic class instructions, in general, support the 8-bit, 9-bit, 16-bit, 32-bit integer and 32-bit floating point data types, and are affected by the element mask. Instruction VCMPV is not affected by the element mask, since it operates on element mask.

TABLE A.1

Arithmetic Class

| Mnemonic | Description |
|---|---|
| VASR | Arithmetic Shift Right |
| VADD | Add |
| VAVG | Average |
| VSUB | Subtract |
| VASUB | Absolute of Subtract |
| VMUL | Multiply |
| VMULA | Multiply to Accumulator |
| VMULAF | Multiply to Accumulator Fraction |
| VMULF | Multiply Fraction |

TABLE A.1-continued

Arithmetic Class

| Mnemonic | Description |
|---|---|
| VMULFR | Multiply Fraction and Round |
| VMULL | Multiply Low |
| VMAD | Multiply and Add |
| VMADL | Multiply and Add Low |
| VADAC | Add and Accumulate |
| VADACL | Add and Accumulate Low |
| VMAC | Multiply and Accumulate |
| VMACF | Multiply and Accumulate Fraction |
| VMACL | Multiply and Accumulate Low |
| VMAS | Multiply and Subtract from Accumulator |
| VMASF | Multiply and Subtract from Accumulator Fraction |
| VMASL | Multiply and Subtract from Accumulator Low |
| VSATU | Saturate To Upper Limit |
| VSATL | Saturate to Lower Limit |
| VSUBS | Subtract Scalar and Set Condition |
| VCMPV | Compare Vector and Set Mask |
| VDIVI | Divide Initialize |
| VDIVS | Divide Step |
| VASL | Arithmetic Shift Left |
| VASA | Arithmetic Shift Accumulator by 1 bit |

Table A.2 list the MPEG instructions. The MPEG instructions support the 8-bit, 9-bit, 16-bit, 32-bit integer data types, and are affected by the element mask.

TABLE A.2

MPEG class

| Mnemonic | Description |
|---|---|
| VAAS3 | Add and Add Sign of (−1, 0, 1) |
| VASS3 | Add and Subtract Sign of (−1, 0, 1) |
| VEXTSGN2 | Extract Sign of (−1, 1) |
| VEXTSGN3 | Extract Sign of (−1, 0, 1) |
| VXORALL | XOR the least-significant-bit of all elements |

Table A.3 lists the inter-element arithmetic class of instructions. The inter-element arithmetic class support the 8-bit, 9-bit, 16-bit, 32-bit integer and 32-bit floating point data types.

TABLE A.3

Inter-element Arithmetic Class

| Mnemonic | Description |
|---|---|
| VADDH | Add Two Adjacent Elements |
| VAVGH | Average Two Adjacent Elements |
| VAVGQ | Average Quad Elements |
| VMAXE | Maximum Exchange Even/Odd Elements |

Tables A.4 and A.5 respectively indicate the input signals selected for adder stage 1 and 2 for selected vector processor instructions.

TABLE A.4

Adder Stage 1 Input Signals

| ADD1H | | | INSTRUCTION | ADD1L | | |
|---|---|---|---|---|---|---|
| A1H | B1H | Cin | | A1L | B1L | Cin |
| Ra<31:0> | 0 | 1 | VASS3;VAAS3 (Rb = 0) | Ra<31:0> | All '1' | 0 |
| Ra<31:0> | 0 | 1 | VASS3;VAAS3 (Rb = Ra) | Ra<31:0> <<1 | All '1' | 0 |
| | | | VAVG&IR<1B> = 1;VADD; VADACL/H; | Ra | Rb | 0 |
| | | | VAVG & IR<1B> = 0; | Ra | Rb | 1 |
| | | | VAVGH& IR<1B> = 1;VADDH: | Ra | Ra (i + 1) * | 0 |
| | | | VAVGH & IR<1B> = 0 | Ra | Ra (i − 1) * | 1 |
| $\overline{Ra}$ | Rb | 1 | VASUB | Ra | $\overline{Rb}$ | 1 |
| Ra | Ra (i + 1) * | 0 | VAVGQ & IR<1B> = 1 | Rb | Rb (i + 1) | 0 |
| Ra | Ra (i + 1) * | 1 | VAVGQ & IR<1B> = 0 | Rb | Rb (i + 1) | 1 |
| MPYSH | MPYCH | ADD1L _Cout | VMACH/L; VMAD | MPYSL | MPYCL | 0 |
| | | | VSATU; VSATL; VSUB; VSUBS | Ra | $\overline{Rb}$ | 1 |

*Ra (7) = Rb (0)

TABLE A.5

Adder Stage 2 Inputs

| ADD2H | | | INSTRUCTION | ADD2L | | |
|---|---|---|---|---|---|---|
| A2H | B2H | Cin | | A2L | B2L | Cin |
| SEXT (ADD1L) * | VACH | Cout_ ADD2L | VADACL/H | ADD1L * | VACL | 0 |
| | | | VAVCQ VDiV2N | ADD1H SFTROT_Out | ADD1L 0 | 0 1 |
| ADD1H | VACH | Cout_ ADD2L | VMAC | ADD1L | VACL | 0 |
| ADD1H | SEXT (Rc) * | Cout_ ADD1L | VMADH/L | ADD1L | Rc * | 0 |
| ADD1H | VACH | Cout_ ADD1L | VMAS | ADD1L | VACL | 1 |

*For data type = WD only
Please see the following Table for Sign extension of other data types Table A.6 illustrates the sign extension process implemented in adder stage 2 for 8-bit data elements (B8), 16-bit data elements (HW), and 32-bit data elements (WD).

TABLE A.6

Sign Extension

| B8 | SEXT Byte3 | Byte3 | SEXT Byte2 | Byte2 | BYTSEXT 2 | BYTE Byte1 | SEXT 1 | BYTE BYTE0 | BYTE 0 |
|----|------------|-------|------------|-------|-----------|------------|--------|------------|--------|
| HW | | SEXT (Hword1) | | Hword1 | | SEXT (Hword0) | | Hword0 | |
| WD | | | SEXT (word0) | | | | Word0 | | |

Note: For unsigned data, SEXT = Zero extended

Table A.7 illustrates a method of using a 36-bit adder to perform either one 32-bit addition, two 16-bit additions in parallel, or four 8-bit additions in parallel. Bits 9, 18, and 27 instead of containing bits from addends have values which block a carry from a preceding bit, propagate a carry bit from a preceding bit, or generate a carry. In Table A.7, FB indicates insertion of 0 in the bit location for both addends to block a carry. FG indicates insertion of 1 in the bit location for both addends to generate a carry, and FP indicates insertion of 1 in the bit location for one addend and 0 in the bit location for the other addend to propagate a carry.

TABLE A.7

| Data type/ Bit index | Bit 9 | Bit 18 | Bit 27 |
|---|---|---|---|
| B8 (8-bit byte) | FB / FG | FB / FG | FB / FG |
| HW (16-bit Half word) | FP | FB/FG | FP |
| WP (32-bit word) | FP | FP | FP |

Where FB/FG means: FB is on if ADD; FG is on if SUBTRACT. None means none of FB, FG or FB is on.

Table A.8 indicates the signal added to the most significant word (MS-WD) and least significant word (LS-WD) of each data element in an accumulator as a result of the listed instructions.

TABLE A.8

Accumulator Additions

VAC

| MS-WD | LS-WD | INST |
|---|---|---|
| ADD2H | ADD2L | VADACL/H |
| Sign → VAC >> 1 | | VASA & IR <22> = 1 |
| VAC << 1 ← 0 | | VASA & IR <22> = 0 |
| ADD2H | ADD2L | VMACL/H; VMAS (L/H) |
| ADD1H | ADD1L | VMULA |

Table A.9 indicates the signals which multiplexer 150 selects as the result for the listed instructions.

TABLE A.9

Result Multiplexer

Result MUX (1)

| ADD1H | VAAS3 & Sign__Ra; v$_{\underline{MULH}}$; v$_{\underline{ASS3}}$ & sign__Ra = 0 & ($\overline{Ra=0}$); VASUB & $\overline{ADD1 \geq 0}$; |
|---|---|
| ADD1L | VAAS3 & Sign_Ra = 0 & ($\overline{Ra=0}$) VADD; VADDH; VASS3 & Sign_Ra = 1; VASUB & ADD1L $\geq$ 0; VAVG; VAVGH; VMULL; VSUB |
| R$_a$ | (VASS3+VAAS3) & Ra = 0 (from U&C); VSATU · (Ra<Rb); VASATL · (Ra $\geq$ Rb) |
| ADD2L | VADACL; VAVGQ; VDiV2N & SFTROT_OUT<0; VMACL; VMADL |

TABLE A.9-continued

Result Multiplexer

Result MUX (1)

| ADD2H | VADACH; VMACH; VMADH |
|---|---|
| SFTROT_ OUT | VDiV2N & SFTROT_OUT $\geq$ 0 |
| 1 | VZXTSGN2 & Ra $\geq$ 0; VZXTSGN3 · Ra > 0 |
| −1 | VZXTSGN2 & $\overline{Ra \geq 0}$; VZXTSGN3 · Ra < 0 |
| 0 | VZXTSGN3 · Ra = 0 |
| R$_b$ | VSATU · (Ra $\geq$ Rb); VSATL · (Ra < Rb) |

We claim:

1. A pipelined computational structure comprising:

a first stage which comprises a first adder and a second adder capable of operating in parallel;

a first multiplexing circuit coupled to the first stage, wherein the first multiplexing circuit selects addend signals applied to the first stage, the first multiplexing circuit selecting from a first set of signals including signals from a register file;

a second stage having input ports coupled to output ports of the first stage, wherein the second stage comprises a third adder and a fourth adder which are capable of operating in parallel;

a second multiplexing circuit coupled to the first stage and the second stage, wherein the second multiplexing circuit selects addend signals applied to the second stage, the second multiplexing circuit selecting from a second set of signals including output signals from the first stage and the signals from the register file; and a first multiplexer having input ports coupled to the first, second, third, and fourth adders, wherein the first multiplexer selects a signal representing the result of an arithmetic operation performed by the structure.

2. The structure of claim 1, further comprising:

a multiplier coupled to the first multiplexing circuit, wherein the first set of signals further includes output signals from the multiplier;

a second multiplexer coupled between the first adder and the second adder, the second multiplexer being alternatively operable in a first mode and a second mode, wherein:

in the first mode, the second multiplexer passes a carry from the first adder to the second adder and the first and second adders operate together as a single adder;

in the second mode, the second multiplexer does not pass the carry from the first adder to the second adder and the first and second adders operate independently; and the second multiplexer operates in the first mode when the first multiplexing circuit selects the output signals from the multiplier.

3. The structure of claim 2, further comprising a third multiplexer coupled between the third adder and the fourth adder, the third multiplexer being alternatively operable in a first mode and a second mode, wherein:

in the first mode, the third multiplexer passes a carry from the third adder to the fourth adder and the third and fourth adders operate together as a single adder;

in the second mode, the third multiplexer does not pass the carry from the third adder to the fourth adder and the third and fourth adders operate independently; and the second and third multiplexers operate in their respective first modes when the arithmetic operation performed by the structure is a multiply-and-accumulate operation.

4. The structure of claim 3, wherein the second operates in the second mode when the arithmetic operation averages four addends.

5. The structure of claim 1, wherein when the arithmetic operation averages values input to the structure, the first multiplexer selects a right shifted version of an output signal from one of the first, second, third, and fourth adders.

6. The structure of claim 5, further comprising rounding logic coupled to control whether sums determined by the adders are incremented for rounding.

7. The structure of claim 1, further comprising an accumulator having an input port coupled to output ports of the third and fourth adders and an output port coupled to the second multiplexing circuit.

8. A vector processor comprising.

a plurality of vector registers, each vector register being capable of storing a plurality of data elements; and a plurality of computational structures; and a selection circuit that selects a first vector register identified in an instruction and applies signals representing data elements from the first vector register to corresponding computational structures for parallel processing of the data elements, wherein each computational structure comprises:

a first stage which comprises a first adder and a second adder capable of operating in parallel;

a first multiplexing circuit coupled to multiplier and the first stage, wherein the first multiplexing circuit selects addend signals applied to the first stage, the first multiplexing circuit selecting from a first set of signals including signals from the selection circuit;

a second stage which comprises a third adder and a fourth adder capable of operating in parallel;

a second multiplexing circuit coupled to the first stage and the second stage, wherein the second multiplexing circuit selects addend signals applied to the second stage, the second multiplexing circuit selecting from a second set of signals including output signals from the first stage and the signals from the selection circuit; and a first multiplexer having input ports coupled to the first, second, third, and fourth adders, wherein the first multiplexer selects a signal representing a result of an arithmetic operation performed by the computational structure.

9. The processor of claim 8, wherein each computational structure further comprises:

a multiplier coupled to the selection circuit and the first multiplexing circuit, wherein the multiplier receives input signals from the selection circuit, and the first set of signals further includes output signals from the multiplier;

a second multiplexer coupled between the first adder and the second adder, the second multiplexer being alternatively operable in a first mode and a second mode, wherein:

in the first mode, the second multiplexer passes a carry from the first adder to the second adder and the first and second adders operate together as a single adder;

in the second mode, the second multiplexer does not pass the carry from the first adder to the second adder and the first and second adders operate independently; and the second multiplexer operates in the first mode when the first multiplexing circuit selects output signals from the multiplier as input signals to the first stage.

10. The processor of claim 9, wherein:

in a first case where the arithmetic operation includes a multiply, the first multiplexing circuit applies a sum signal and a carry signal from the multiplier to the first adder as addends; and in a second case where the arithmetic operation includes adding data elements, the first multiplexing circuit applies signals from the select circuit to the first adder as addends.

11. A method for operating a computational structure, comprising:

applying signals representing input operands to a computational structure comprising:

a multiplier;

a first stage that includes a first adder and a second adder capable of operating in parallel;

a first multiplexing circuit that selects addend signal for the first stage, the first multiplexing circuit selecting from a first set of signals that includes output signals from the multiplier and signals from outside the computational structure;

a second stage that includes a third adder and a fourth adder which are capable of operating in parallel;

a second multiplexing circuit that selects addend signal for the second stage, the second multiplexing circuit selecting from a second set of signals that includes output signals from the first stage and signals from outside the computational structure; and a first multiplexer having input ports coupled to the first, second, third, and fourth adders;

identifying an arithmetic operation from a plurality of arithmetic operations that the computational structure is capable of performing;

operating the first and second multiplexing circuits to select addend signals as required for the arithmetic operation; and operating the first multiplexer to select from among output signals of the first, second, third, and fourth adders, a signal representing a result for the arithmetic operation identified.

12. The method of claim 11, wherein the plurality of arithmetic operations that the computational structure is capable of performing includes a multiply, a multiply-and-accumulate, and an addition.

13. The method of claim 12, wherein the plurality of arithmetic operations that the computational structure is capable of performing further includes averaging four addends.

* * * * *